Patented May 30, 1933

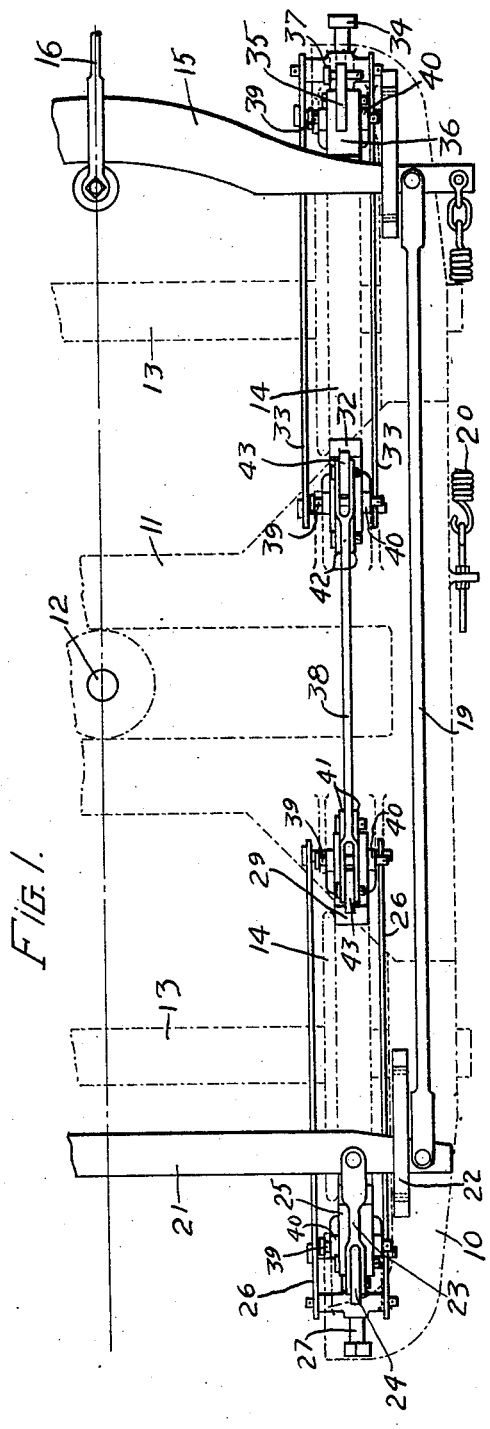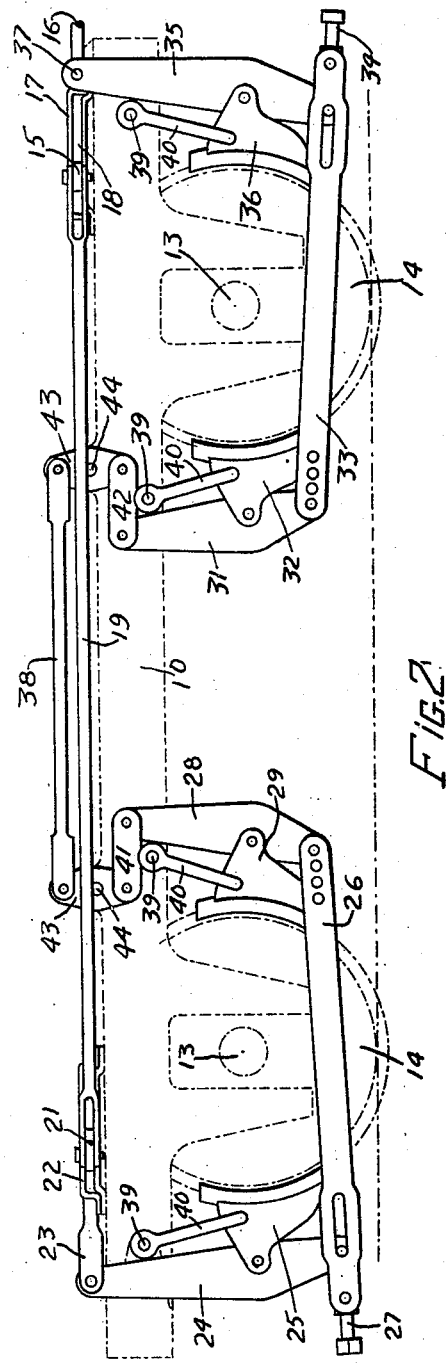

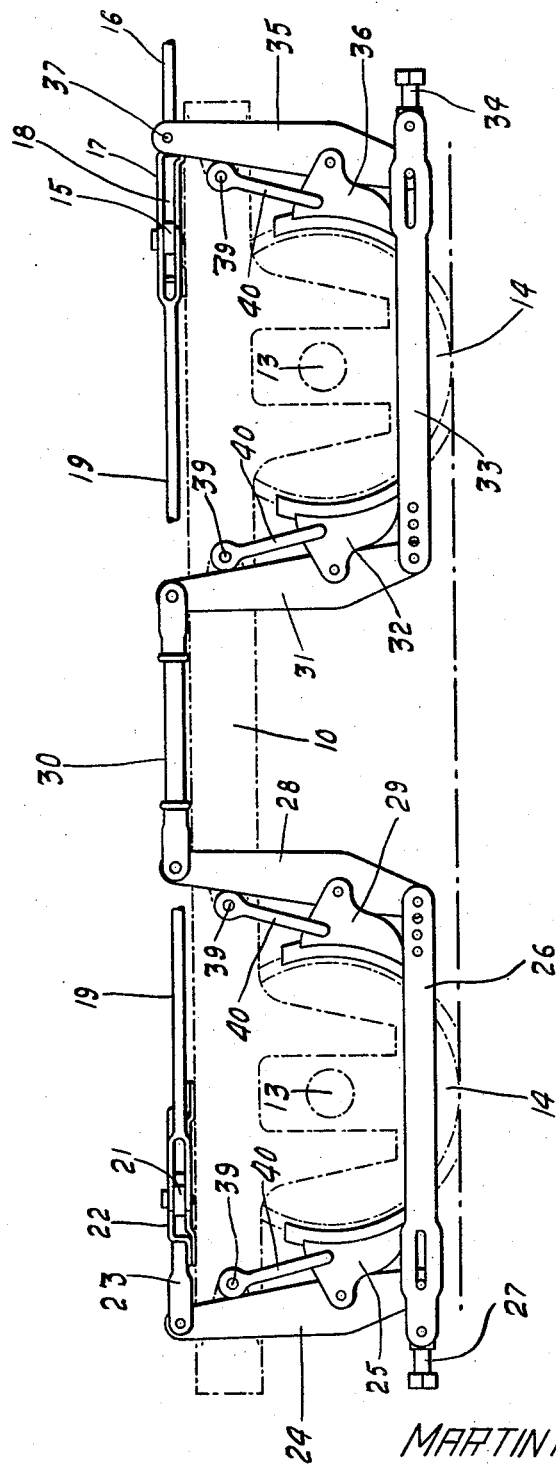

1,911,940

UNITED STATES PATENT OFFICE

MARTIN P. BLOMBERG, OF CHICAGO, ILLINOIS, ASSIGNOR, BY MESNE ASSIGNMENTS, TO PULLMAN CAR & MANUFACTURING CORPORATION, A CORPORATION OF DELAWARE

CLASP BRAKE RIGGING

Application filed April 22, 1929. Serial No. 357,266.

The invention relates to clasp brake rigging for pivotal car trucks having two or more pairs of wheels. This type of rigging provides equalized brake shoe pressures to opposite sides of each wheel and is particularly adapted for use on trucks in which the space between the wheels of each pair is occupied by motors or generators carried upon one or more of the axles.

To provide clasp brake rigging operable in planes of the several wheels and outside thereof is the special province of this invention, the present embodiment of which contemplates the disposition of the truck levers and equalizing radius bar in such relation that the full force of the braking power will be delivered directly to the brake levers of one pair of wheels, without the intervention of intermediate levers for equalizing the pressure of the shoes on opposite sides of the wheels of that pair, and transmitting such power directly to adjacent pairs of wheels by suitable transmission members having direct connection with upper ends of adjacent inner levers.

A further and important object is to so dispose the levers and rods on opposite sides of the truck in single trains that the force required to produce a given brake shoe pressure will be considerably lessened and the weight of the parts substantially reduced.

A still further object is to dispense with the use of brake beams and to otherwise simplify the brake arrangement.

The foregoing and other objects are attained by the mechanism illustrated in the accompanying drawings, in which—

Fig. 1 is a plan view of a pivotal truck equipped with one form of the invention, the truck frame, wheels, and axles being indicated in broken lines;

Fig. 2 is a side elevational view of a clasp brake rigging of the embodiment shown in Fig. 1; and Fig. 3 is a similar view of a modified transmission connection between the upper ends of adjacent brake levers.

In clasp brake rigging for motor trucks it has been the practice to provide equalizing levers intermediate the radius bar and the first brake lever in the series and position them adjacent the transverse center line of the truck with the rods extending in opposite directions for connection with the various levers, resulting in a multiplicity of floating parts and resultant wear at the joints with consequent variation in power applied to the brake levers. This objection has been overcome by the mechanism of this invention in which intermediate equalizing levers are omitted altogether and power applied directly to the brake levers, and simple transmission connections employed between the levers of adjacent pairs of wheels.

In the drawings, 10 represents the car truck frame, 11 the transoms, 12 the center plate, 13 the axles, and 14 the wheels. Upon the truck frame is mounted the usual radius equalizing bar 15 actuated by pull rod 16 leading to a source of power on the car and slidably supported at its opposite ends in brackets 17 arranged on opposite sides of the truck, but one-half of the truck being indicated since the structure is symmetrical and parts of the rigging are duplicated on opposite sides. The radius bar moves in bracket slot 18 having a length proportioned to radius bar movement with the ends of the bar protruding beyond the bracket to permit attachment of connection rods 19 and release spring 20.

The connection rods 19 are secured to protruding ends of a supporting crossbeam 21 mounted in brackets 22 on the truck frame, and the crossbeam secured to adjacent live brake levers 24 by short links 23 to provide a direct connection between rods 19 and levers 24. The levers are fulcrumed at their intermediate portions to brake shoes 25 and at their lower portions to tension yokes 26 having lever fulcrum adjustment mechanism 27 at their outer ends for taking up slack due to wear on shoes, wheels, or connections. Live levers 24 are connected through yokes 26 to lower ends of inner levers 28 fulcrumed to brake shoes 29, the inner levers 28, in the preferred embodiment, to compression connecting bar 30 as shown in Fig. 3, the opposite end of said bar being connected to inner levers 31 of the adjacent pair of wheels. Levers 31, at their intermediate portions, are fulcrumed to brake shoes 32, and at their lower ends to tension yokes 33 having fulcrum adjustment mechanism 34 at their outer ends. The yokes 33 at their outer ends are secured to lower ends of dead levers 35 fulcrumed to brake shoes 36 and at their upper ends to fixed brackets 37 on truck frame 10. The brake shoes and levers, and through them the lever connections, are operatively supported from brake hangers 40 pivotally secured to brackets 39 on the truck frame 10.

The transmission element of the preferred embodiment being a connecting bar 30 subjected to compressive operating forces, would not be feasible for use in trucks having long wheel bases and proportionately greater distance between the inner brake levers 28 and 31, since the section and weight of an adequate column of the required length would be impracticable for such purpose. To avoid compression columns of abnormal proportions, the inner levers 28 and 31 may be connected by a system of links 41—42 and tie rods 38 coupled to pairs of levers 43 having fixed fulcrums 44 intermediate their respective ends and adapted to convert the erstwhile compressive transmission effort obtained from the single connecting bars 30 into components providing lever connecting transmissions wherein all of the associated links and rods are placed in tension to permit the use of relatively light members of sufficient strength to transmit the braking power from one pair of wheels to another.

From the foregoing it will appear that there has been provided a foundation brake rigging for pivotal car trucks whereby all of the space above the axles and between respective pairs of wheels has been left free for the installation of motors or generators without interference from the brake transmission rods or hampering presence of brake beams customarily found in rigging of the clasp brake type.

What I claim is:—

1. In a brake rigging for pivotal car trucks having a truck frame including a plurality of pairs of wheels, brake levers fulcrumed on brake shoes operatively hung from the truck frame upon opposite sides of each wheel, tie bars connecting the lower ends of said levers, transmission members connecting the upper ends of adjacent inner levers, a radius bar supported at one end of the truck, crossbar retaining brackets on the truck frame, a crossbar supported at the opposite end of the truck slidable within said brackets and connected with the upper ends of adjacent brake levers, the ends of said crossbar projecting beyond said brackets, pull rods directly connecting said radius bar and the ends of said crossbar, and a pull rod connecting said radius bar with a source of power on the car.

2. In a brake rigging for pivotal car trucks having a truck frame including a plurality of pairs of wheels, brake levers upon opposite sides of said frame fulcrumed on brake shoes operatively hung from the truck frame upon opposite sides of each wheel, tie bars connecting the lower ends of said levers, a radius bar supported at one end of the truck, pull rods directly connecting said radius bar with the levers at opposite end of the truck, a crossbar connecting said pull rods and adjacent levers, transmission members connecting the upper ends of the inner levers of adjacent pairs of wheels, and a pull rod connecting said radius bar with a source of power on the car.

In witness whereof I have hereto set my hand this 16th day of April, 1929.

MARTIN P. BLOMBERG.